Nov. 22, 1960     W. D. ALLISON     2,961,253
FRONT STABILIZER MECHANISM FOR AN AUTOMOTIVE VEHICLE
Filed July 23, 1956     3 Sheets—Sheet 1

*INVENTOR.*
WILLIAM D. ALLISON
BY
ATTORNEY

Nov. 22, 1960     W. D. ALLISON     2,961,253
FRONT STABILIZER MECHANISM FOR AN AUTOMOTIVE VEHICLE
Filed July 23, 1956     3 Sheets-Sheet 3

*INVENTOR.*
WILLIAM D. ALLISON
BY
Elmer Jamison Gray
ATTORNEY

United States Patent Office 2,961,253
Patented Nov. 22, 1960

2,961,253

FRONT STABILIZER MECHANISM FOR AN AUTOMOTIVE VEHICLE

William D. Allison, Grosse Pointe Farms, Mich., assignor to Motor Research Corporation, Detroit, Mich., a corporation of Michigan Filed July 23, 1956, Ser. No. 599,383

9 Claims. (Cl. 280—96.2)

This invention relates to wheel suspensions for automotive vehicles, and is more particularly directed to improved stabilizer and variable rate spring mechanism which improves the stability and control of such vehicles.

A primary object of the invention is to provide an anti-roll torsion bar stabilizer and variable rate spring for a pair of oppositely disposed wheels independently suspended from a vehicle frame, each suspension including a wheel supporting member oscillatable with its associated wheel, the torsion bar having its end portions angularly disposed to provide lever arms interposed between the wheel supporting members to torsionally resist relative vertical movement of the wheels and frame, the torsion bar being installed in such a manner that it imparts a spring rate to the wheels whenever the wheels are displaced vertically in the same direction as by initially bowing the bar intermediate the lever arms or otherwise placing the bar in compression in the assembly to produce an outward force on the wheel supporting members tending to maintain the wheels in their normal vertical position by resisting swinging movement at an increasing rate above or below the normal upright position of the wheel supporting members.

Another object of the invention is to provide a stabilizing means on the front end of an automotive vehicle frame, which is of such construction and arrangement that it tends to at least partially prevent the shifting tendency of the front wheels and excessive rolling of the body frequently encountered when driving cars at high speeds over uneven roads or around curves, and which is adapted to balance out or oppose the tendencies of the wheels to turn involuntarily from their intended course.

Other objects of this invention will appear in the following description and appended claims, reference being had to the accompanying drawings forming a part of this specification wherein like reference characters designate corresponding parts in the several views.

In the operation of automotive vehicles, particularly at relatively high speeds, over uneven or rough roads or around curves, numerous problems arise in maintaining the desired control of the wheels, particularly the front wheels and maximum stability of the vehicle. For example, when the car is travelling at relatively good speed around a curve the body tends to roll or tilt upwardly due to the effect of centrifugal force. Frequently the tilt or roll of the body and frame under such circumstances results in the transmission of forces to the front wheels tending to turn or urge them undesirably in the direction in which the car is travelling around the curve and the car does not right itself as readily as desired when coming out of the turn or curve in the road. Again it frequently happens that while travelling over rough roads or uneven pavement, especially at relatively high speeds, the rise or fall of the front wheels or of one front wheel relatively to the other, producing variations in the wheel camber, tends to set up gyroscopic forces, which results in causing a tendency or urge of the wheels to turn in one direction or the other. This effect is often characterized as wheel fight and is often felt by the driver in apparent jerkiness in the steering mechanism. Thus, under various conditions of operation and in various makes of cars with different types of front wheel suspensions, a variety of problems are encountered such as arise from the tendency of the front wheels to shift their material or intended direction, tendencies to shimmy under certain conditions, tendencies of the wheels to turn undesirably as a result of gyroscopic or centrifugal forces, and inability of the car to right itself immediately after coming out of a turn due to body roll or tilting induced by centrifugal forces.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
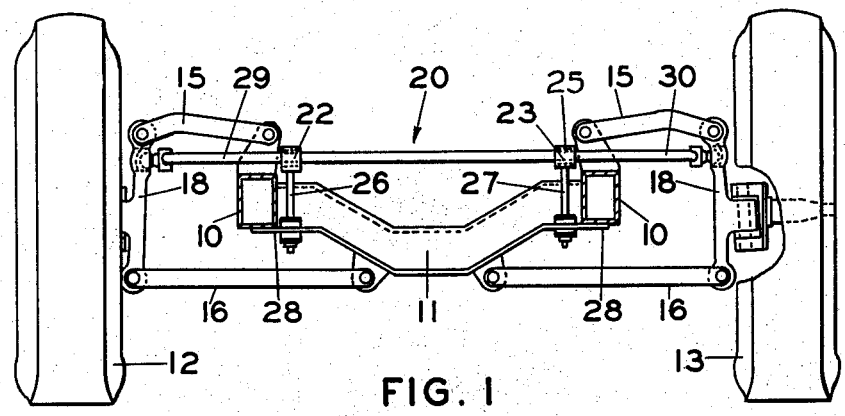
Fig. 1 is a front view of the front portion of a motor vehicle chassis provided with a torsion bar stabilizing and variable rate spring mechanism forming one embodiment of the present invention.
Figure 2:
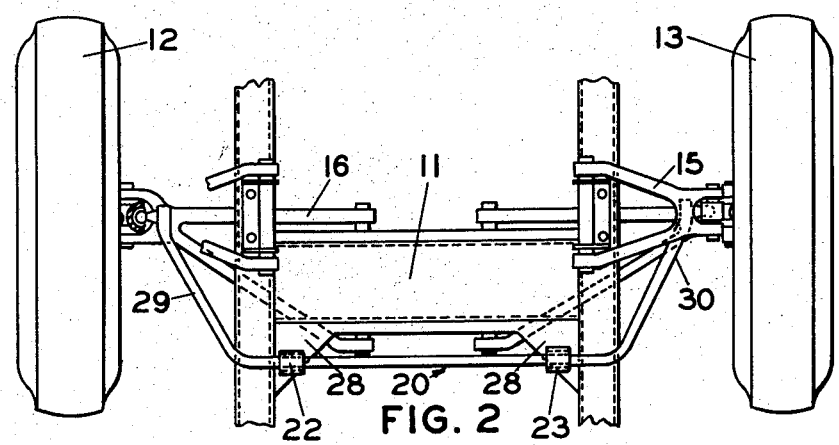
Fig. 2 is a plan view of the parts shown in Fig. 1.

There are illustrated in the drawings, by way of example, certain embodiments of the invention as applied to a motor vehicle having a front end construction comprising a frame including side sills or frame members 10 connected together by a main drop type front cross member 11, and a pair of front independently mounted steering wheels 12 and 13. Each front wheel is supported by upper and lower suspension arms 15 and 16, mounted at right angles to the longitudinal axis of the vehicle for swinging movement in a substantially vertical plane. As shown in Figs. 1 and 2, the outer bifurcated ends of the lever arms 15 and 16 may be pivotally joined together by a generally vertically disposed spindle and king pin mounting 18 of suitable type, oscillatable with the wheel associated therewith. Any suitable spring assembly of conventional design may be employed, such assembly not being shown in the present instance as knowledge of the particular spring assembly employed is not necessary for a complete understanding of the invention.

For the purposes of the present invention a combined stabilizing and variable rate spring device is provided which has the effect of wholly or partly neutralizing or offsetting the moments of force produced about the steering axes as a result of the centrifugal and/or gyroscopic forces which are set up against the wheels under certain driving conditions, but particularly at high speeds, and tend to shift the wheels from their intended path. Additionally, the device serves as a supplemental spring mechanism capable of adding a variable rate to the action of the main front springs of the vehicle, to prevent or greatly reduce the tendency of the front end of the vehicle to rise or fall during travel over rough or uneven roads and to nose down or dip as the result of changes in load due to brake application while the vehicle is driven at certain speeds. The said device comprises a torsion bar 20 which is journalled or otherwise rotatably supported upon the vehicle frame. In the present embodiment the bar 20 is supported by two rubber blocks or bushings 22 and 23 clamped or fitted in supporting yokes 24 and 25 mounted atop two vertical struts 26 and 27 fastened to horizontal flange portions or brackets 28 of the frame cross member 11. The bar 20 has its end portions 29 and 30 extending completely through and beyond the blocks 22 and 23, said portions being bent outwardly at obtuse angles at spaced points from said blocks, whereby they normally extend rearwardly and generally horizontally in the form of lever arms or crank-like members. It should be observed, however, that these lever arms 29 and 30 may extend forwardly or in any other direction with the same results provided they can be suitably attached to the front wheel supporting means.

Extending outwardly toward the wheels 12 and 13 are connecting pivots or ball members 32 and 33 which are suitably retained in socket members 35 provided in apertures 36 in the king pin mountings 18 below the pivotal connections of the upper suspension arms 15. The ball joint connection thus provided insures freedom of movement of the lever arms 29 and 30 with their respective mountings 18. An arrangement such as the above insures that any forces exerted by the torsion bar 20 and ball joint are applied to the wheels 12 and 13 at a point offset or spaced from the king pins which, as will subsequently appear, is important from the standpoint of the present invention.

Figure 3:
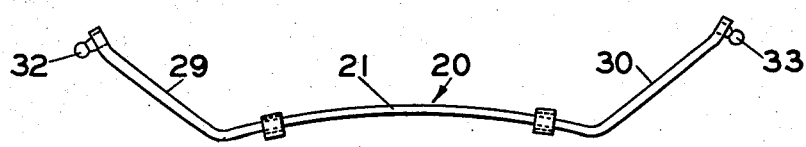
Fig. 3 is a plan view showing the free shape of the stabilizer bar shown in Fig. 2.

As particularly shown in Fig. 3, the bar 20, intermediate the bends which produce the lever arms 29 and 30, is initially bowed at 21 rearwardly or in the direction of the arms. The free shape of the bar 20 is substantially as shown in Fig. 3, it being noted that the lever arms 29 and 30 form considerably wider angles with respect to the intermediate portion of the bar than when installed in the vehicle. In other words, the bar is preloaded a predetermined amount prior to installation so that the desired outward force may be applied to the wheel supports. It will be understood also that the bar 20 could be straight intermediate the lever arms 29 and 30 and bowed during installation by compressing the lever arms inwardly. Accordingly, it will be clear that the bar 20 is consequently installed under compression between the mountings 18 and, therefore, the bar exerts an outward horizontal pressure on each wheel support member. This outward pressure has the additional desirable effect, beside its anti-roll stabilizing action, of holding the suspension arms 15 and 16 in their normal substantially horizontal position, by providing an auxiliary spring with a definite spring rate to the system. Such springing accommodates and compensates for vertical motion of the wheels. As each wheel goes up and down the joint or pivot at the end of the bar 20 is moved closer to the center line of the vehicle due to the geometry of the upper and lower suspension arms 15 and 16. This results in a further compression of the bar 20 increasing the load on the end of the lever arms 29 and 30. This variation in load gives a variable spring effect having no rate at the suspension arm horizontal position but progressively increasing as the wheel goes up or down.

Figure 7:
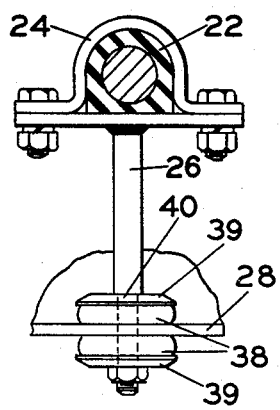
Fig. 7 is an elevational view partly in section of one of the stabilizer supporting struts.

The connecting rods or struts 26 and 27 are fastened to the frame brackets 28 by means of the rubber gaskets or washers 38 and the clamping plates 39, such as shown more clearly in Fig. 7. To accomplish this the struts 26 and 27 are provided with annular shoulders 40 against which a clamping plate 39 is placed. A gasket 38 is then applied over the end of the rod in contact with said plate, and after inserting the end of the rod 26 and 27 through an aperture in one of the brackets 28, another gasket and plate is applied, whereupon the entire assembly may be firmly fastened by a nut or the like, which is turned down to place the rubber rings 38 in compression against opposite faces of the brackets 28.

Figure 4:
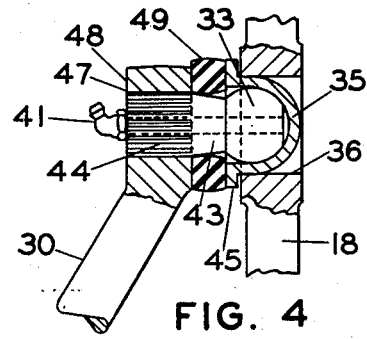
Fig. 4 is a fragmentary detail view showing a form of ball joint connection between the end of the stabilizer bar and wheel support member.
Figure 8:
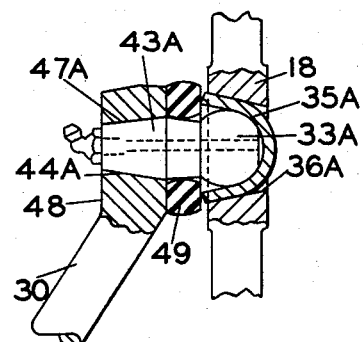
Fig. 8 is a view, similar to Fig. 4, showing another form of ball joint connection.

In Figs. 4 and 8 are illustrated two forms of ball joints capable of directly connecting the outer extremities of the load arms 30 to the wheel supports 18. As particularly shown in Fig. 4 the ball 33 is formed on the end of a stub shaft 43 knurled at 44 for non-rotatable engagement with the walls of an aperture 47 perpendicular to the bar end 48. A stamped socket 35 is flanged at 45 to locate the socket in aperture 36 and provide an abutment for resilient washer or gasket 49 interposed between the socket 35 and bar end 48 to shock insulate these parts. A lubricant fitting 41 is received in the end of a longitudinal bore in the stub shaft 43 to permit the passage of lubricant to the ball joint in the usual manner. The structure in Fig. 8 differs from Fig. 4 in that the stub shaft 43A is tapered at 44A for reception in a tapered aperture 47A in the bar end. Further, the socket member 35A is conical adjacent its open end to prevent its passage through the tapered aperture 36A in the support member 18. In both forms the ball cup or socket is retained in position by the outward pressure exerted by the bar 20 through the load arms 30 thus compressing gasket 49 to seal the socket against loss of lubricant.

Figure 5:
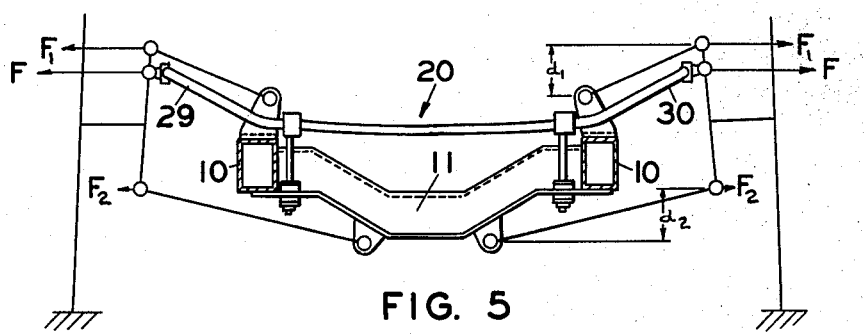
Fig. 5 is a fragmentary front view of stabilizer and frame diagrammatically illustrating the spring rate effect of the stabilizer.
Figure 6:
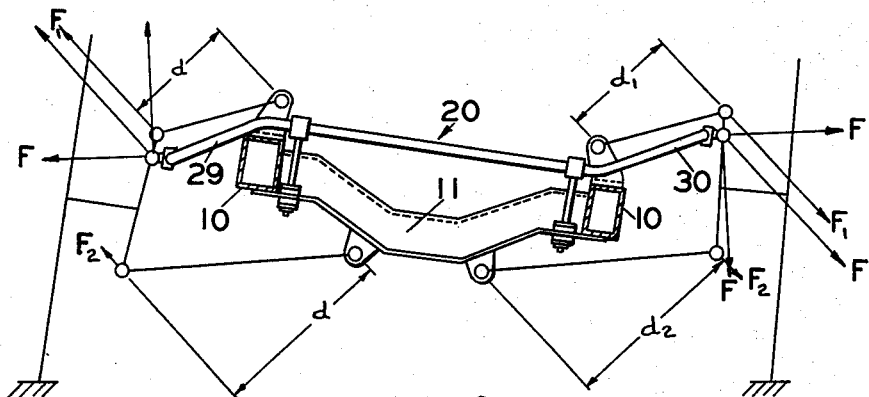
Fig. 6 is a view similar to Fig. 5 but illustrating the restoring force of the stabilizer on the wheels.

In the type of independent suspension described above, the suspension arms are approximately horizontal at the normal riding height of the vehicle frame. The outward pressure applied to the wheel supports will tend to hold the suspension arms in their horizontal position and the torsion bar will supply a very definite spring rate to the system for vertical motion of the wheel. As the wheel goes up and down, the ball joint or pivot at the end of the bar is moved closer to the center of the car by the geometry of the upper and lower suspension arms. This is illustrated in Fig. 5 and results in a further compression of the stabilizer bar giving an increased load shown at F in Fig. 5. It will be noted that $F = F_1 + F_2$, and that the restoring force on each wheel is $F_1d_1 + F_2 + d_2$ producing a total restoring force of $2(F_1d_1 + F_2d_2)$. This variation in F due to wheel position will give a variable rate spring effect having no rate at the horizontal position of the suspension arms and a progressively increasing rate as the wheel goes up or down. The stabilizer further provides anti-roll operation due to the fact that when one wheel goes up while another is going down the stabilizer bar is subject to torsion as well as the bending in compression. This is illustrated in Fig. 6 where it will be noted that the restoring force F on each wheel is shown as being equal to $F_1d_1 + F_2d_2$. In such cases F is the vector sum of F compression plus F torsion so that the compression force when added to the torsion force greatly increases the effectiveness of the stabilizer bar in providing anti-roll operation. It will be noted also from Fig. 6 that this restoring force is in the direction opposite to wheel movement and in the same direction as frame movement adjacent such wheel and thus there is the tendency on the part of the stabilizer to maintain the frame on an even keel and this prevents dip or bounce of the vehicle.

Figure 9:
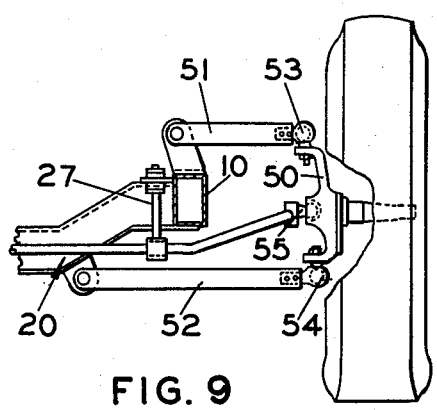
Figs. 9, 10 and 11 and 12 are partial front views of the front end of a vehicle chassis, each illustrating a modified installation of the stabilizer bar.

In the arrangement shown in Fig. 9, the wheel support 50 is connected to the upper and lower suspension arms 51 and 52 by means of ball joints 53 and 54. The stabilizer bar 20 is connected to the wheel support 50 between and preferably on the axis of the ball joints 53 and 54 as at 55 which is also a ball joint connection. Ball joint 55 is provided with angular clearance sufficient to permit steering through the ball joints 53 and 54 as will be understood. To support the bar 20 the struts 27 depend from the bracket to locate the bushings below the frame 10. This arrangement would permit steering of the wheels without altering the position of the stabilizer joint, and still provide the restoring force and variable spring rate of the form of the invention described in connection with Fig. 1.

Figure 10:
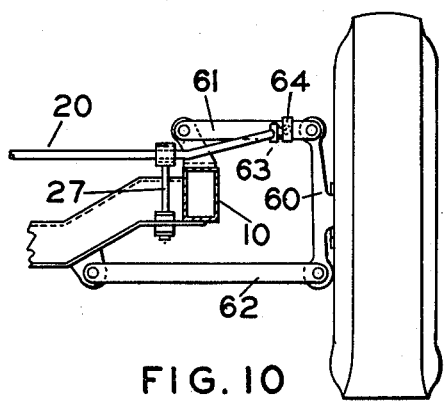

In Fig. 10 the wheel support 60 may be of conventional form suitably pivoted to the outer ends of upper and lower suspension arms 61 and 62. The stabilizer bar 20 is here connected to the upper suspension arm 61 directly through a ball joint at 63. The socket portion of the ball joint is provided in a bracket 64 carried by the arm 61 inwardly of the outer pivotal connection between the arm 61 and support 60.

Figure 11:
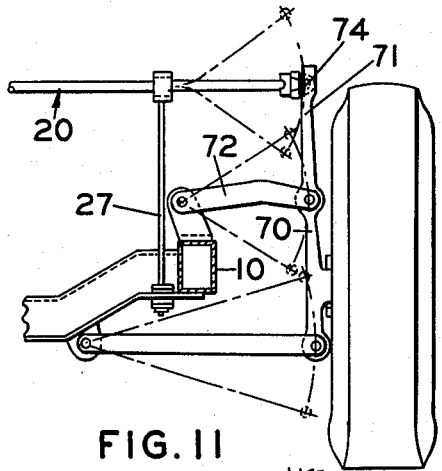

Fig. 11 shows a further modification in which the wheel support member 70 is formed or otherwise provided with an extended portion 71 terminating above the upper suspension arm 72. The stabilizer bar 20 is connected to the upper extremity of the extension 71 by a ball joint 74 arranged in alignment with the pivotal connections between the member 70 and the upper and lower suspension arms and inside of the king pin axis. Such an arrangement has the advantage of providing greater restoring force by increasing the spring rate over embodiments in which the stabilizer is attached to the support in a lower position. The higher the stabilizer bar can be attached to the support the greater will be the restoring force of the bar due to increased compression of the bar as a result of oscillating or vertical swinging movement of the wheel support.

Figure 12:
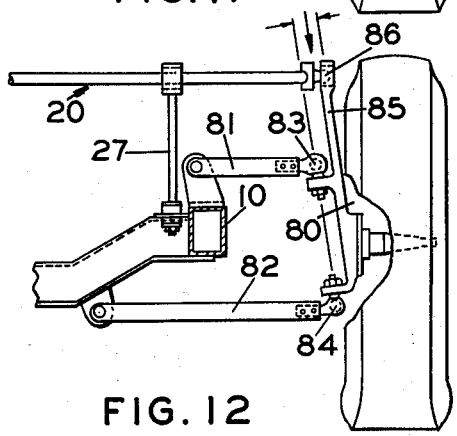
Figure 13:
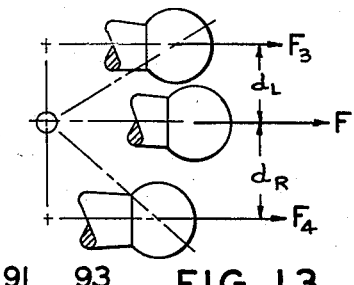
Fig. 13 is a view in the direction of the arrow in Fig. 12 showing the restoring effects of the stabilizer upon the front wheels.

Fig. 12 is similar to Fig. 11 except that wheel support 80 is attached to the upper and lower suspension arms 81 and 82 by ball joints 83 and 84 and the support extension 85 and, therefore, the ball joint 86 between the stabilizer bar 20 and the extremity of the extension 85 are outside of the pivotal axis of the ball joints 83 and 84 as shown in Fig. 13, the outward pressure of stabilizer bar 20 has leverage about the wheel ball joint axis when the wheel is turned out of the straight ahead position. This construction has the advantage of providing increased steering recovery or straightening of the front wheels when coming out of a turn. In this arrangement the stabilizer ball joint 86 lies outside the axis of the wheel supporting ball joints 83 and 84. As the wheels are turned for steering, the position of the ball joint 86 is rotated around the axis of the steering pivots 83 and 84 and increases the compression on the stabilizer bar as shown in Fig. 13, and also is displaced longitudinally from the axis of the steering pivots by the dimension $d_L$ or $d_R$ in Fig. 13. The pressure of the bar 20 applied through the ball joints to the member 85 times the displacement tends to restore the wheels to straight ahead position.

Figure 14:
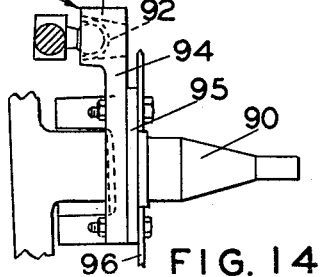
Figs. 14 and 15 are fragmentary front and top plan views, respectively, illustrating the connection of the stabilizer bar directly to the wheel spindle forwardly of the king pin axis.
Figure 15:
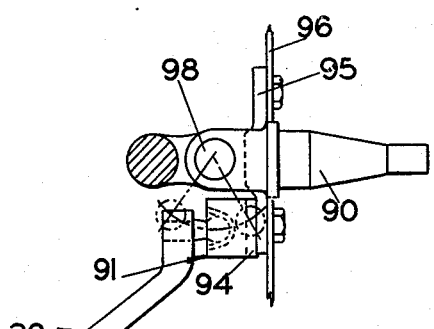

The stabilizer bar applies the load directly on the wheel spindle 90 in the form of the invention shown in Figs. 14 and 15. It will be noted that the load arm ends of the bar 20 are connected by ball joints 91, the socket portion 92 of which are carried in the enlarged end 93 of a bracket 94 bolted or otherwise secured to the king pin mounting 95 which also supports the brake backing plate 96. While the bracket 94 is shown forwardly of the axis of the king pin 98, it is to be understood that the bracket 94 as well as the ball joint 91 could be located rearwardly of the king pin axis. In either location the load applied by the stabilizer bar will provide a restoring effect for the straight-ahead direction of the front wheels to assist in overcoming the steering friction in power steering mechanism, for example. This arrangement is also capable of overcoming wheel flight, which is the tendency or urge of the wheels to turn in one direction or the other resulting from variations in wheel camber due to the rise or fall of one wheel relatively to the other when travelling over rough roads. By preloading the spindle supports directly by means of the present bar, the effect will be to constantly urge the wheels in their straight-ahead direction.

Upon utilizing my stabilizer in the manner referred to and described above, a marked improvement in road sense will be noted upon driving the car at all speeds, but particularly at high speeds. A noticeable recovery effect will also be observed on making fast turns, and in fact the car will be found to build up a recovery effort on such turns which increases in direct proportion to the speed of the car. Thus, the stabilizer exerts an effect which is equivalent to an increase in the caster angle and, in fact, permits a reduction of several degrees in such angle. Further, it reduces to a marked extent any tendency to wheel fight due to gyroscopic forces, resists all tendency to shimmy, produces a much more substantial "feel" in the steering wheel, and permits greater control of the car in high winds. The many advantages of the stabilizer in accordance with the present invention are clearly apparent in connection with wheel suspensions of the independent type. While the foregoing is directed primarily to improving front wheel suspensions, it is to be understood that the stabilizer effect of the bar could be utilized as well in certain types of rear wheel suspensions, particularly as an anti-sway bar.

I claim:

1. In a front wheel suspension for a motor vehicle, the combination of a frame, front wheel supporting means, a pair of front wheels, and a stabilizer therefor, said stabilizer comprising a transverse bar extending across said frame and having its ends bent longitudinally of the vehicle and connected at said ends under compression to said wheel supporting means by ball joints which extend angularly with respect to said bent ends and said wheels.

2. In a vehicle, the combination with a pair of oppositely disposed wheels and an independent suspension for each wheel, each suspension including a member oscillated with the wheel associated therewith, of a socket member in each of said members, a stabilizer bar having its ends initially compressed toward each other by said members, and a ball member extending from each arm into said socket members, said socket members being retained in said members by the outward pressure exerted by said bar.

3. In a vehicle, the combination with a pair of opposite independently suspended upright wheel carrying members and normally horizontally disposed suspension arms for swingingly supporting said members in an upright position, of a torsion bar having a body portion extending transversely of the vehicle and having end lever arms angled from said body portion, means connecting said lever arms to said members for holding said bar at all times under bending stress between said wheel carrying members so as to constantly urge said suspension arms toward their horizontal position, said lever arms being pre-stressed when attached to said members.

4. In a motor vehicle having a frame structure, steerable wheel supporting means carried by the frame structure and normally extending in a generally horizontal direction, steerable wheels having swingable portions mounted on said wheel supporting means, and combined stabilizer and variable rate spring means comprising a transversely extending member movably mounted on the frame structure and having lever arms operably connected in pre-stressed condition and under bending stress to said swingable portions of the steerable wheels, and means for holding said lever arms at all times in relatively deflected positions and for continuously applying outward pressure on said swingable portions in all positions thereof and at a variable rate.

5. A stabilizer for a motor vehicle having a frame structure, wheel supporting means carried by the frame structure, steerable wheels having swingable portions mounted on said wheel supporting means, said stabilizer comprising a generally transversely extending member movably mounted on the frame structure and having lever arms operably connected in pre-stressed condition and under bending stress to said swingable portions of the steerable wheels and held thereby in relatively deflected positions for imparting horizontal forces to the steerable wheels in all positions thereof and at an increasing rate upon increasing vertical displacement of the steerable wheels relative to the frame structure.

6. A wheel suspension according to claim 5 in which the stabilizer lever arms are connected to swingable portions of the wheels at points offset longitudinally of the vehicle from the steering axes of the wheels.

7. A wheel suspension according to claim 5 in which the stabilizer lever arms are connected to swingable portions of the wheels at points offset forwardly of the steering axes of the wheels.

8. A wheel suspension according to claim 5 in which the stabilizer lever arms are connected to swingable portions of the wheels at points offset transversely of the vehicle from the steering axes of the wheels.

9. A wheel suspension according to claim 5 in which the stabilizer lever arms are connected to swingable portions of the wheels at points offset outwardly with respect to the steering axes of the wheels.

References Cited in the file of this patent

UNITED STATES PATENTS

| | | |
|---|---|---|
| 1,093,352 | Pawsat | Apr. 14, 1914 |
| 2,497,459 | Leighton | Feb. 14, 1950 |
| 2,523,473 | Leighton | Sept. 26, 1950 |
| 2,626,797 | Cuskie | Jan. 27, 1953 |
| 2,660,449 | MacPherson | Nov. 24, 1953 |